US010157020B1

(12) United States Patent
Taylor et al.

(10) Patent No.: US 10,157,020 B1
(45) Date of Patent: Dec. 18, 2018

(54) OPTIMIZING COPY PROCESSING BETWEEN STORAGE PROCESSORS

(71) Applicant: EMC IP Holding Company LLC, Hopkinton, MA (US)

(72) Inventors: Alan L. Taylor, Cary, NC (US); Karl M. Owen, Chapel Hill, NC (US); Arun Joseph, Morrisville, NC (US); William S. Burney, Apex, SC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/501,415

(22) Filed: Sep. 30, 2014

(51) Int. Cl.
*G06F 3/06* (2006.01)
*G06F 11/14* (2006.01)

(52) U.S. Cl.
CPC .......... *G06F 3/0659* (2013.01); *G06F 3/0604* (2013.01); *G06F 3/0689* (2013.01); *G06F 11/1464* (2013.01); *G06F 11/1466* (2013.01)

(58) Field of Classification Search
CPC ................................ G06F 12/109; G06F 3/067
See application file for complete search history.

(56) References Cited

U.S. PATENT DOCUMENTS

| | | | | |
|---|---|---|---|---|
| 5,761,659 A * | 6/1998 | Bertoni | ...................... | G06F 9/52 |
| | | | | 707/8 |
| 6,457,109 B1 * | 9/2002 | Milillo | ................... | G06F 3/0605 |
| | | | | 711/161 |
| 6,772,309 B1 * | 8/2004 | Ohr | ........................ | G06F 3/0601 |
| | | | | 707/999.202 |
| 8,504,757 B1 * | 8/2013 | Bolt | ........................ | G06F 12/10 |
| | | | | 711/103 |
| 8,972,656 B1 * | 3/2015 | Armangau | ............ | G06F 3/0665 |
| | | | | 711/114 |
| 2002/0124138 A1 * | 9/2002 | Garrett | ................... | G06F 3/0604 |
| | | | | 711/113 |
| 2006/0069887 A1 * | 3/2006 | LeCrone | ............. | G06F 11/2058 |
| | | | | 711/162 |

(Continued)

OTHER PUBLICATIONS

U.S. Appl. No. 14/501,518, filed Sep. 30, 2014, Taylor, et al.

(Continued)

*Primary Examiner* — Ann J Lo
*Assistant Examiner* — Masud K Khan
(74) *Attorney, Agent, or Firm* — Muirhead and Saturnelli, LLC

(57) ABSTRACT

Techniques are described for copying data. At a first storage processor, a copy request is received to copy data including copying source data from a source area of a source logical device to a destination area of a destination logical device. The source logical device is owned by the first storage processor and the destination logical device is owned by a second storage processor. The first storage processor receives, from the second storage processor, destination location physical storage mapping information for the destination area. A destination physical device location corresponding to the destination area is determined. The source data from the source area is stored in a first cache location of a first data cache of the first storage processor. The first cache location is modified to indicate it includes write pending data for the destination physical device location. The source data is destaged to the destination physical device location.

18 Claims, 6 Drawing Sheets

(56) References Cited

U.S. PATENT DOCUMENTS

| | | | |
|---|---|---|---|
| 2011/0029730 A1* | 2/2011 | Durocher | G06F 12/0866 |
| | | | 711/114 |
| 2012/0124309 A1* | 5/2012 | Watanabe | G06F 3/0607 |
| | | | 711/162 |
| 2013/0036128 A1* | 2/2013 | Ben-Tsion | G06F 13/00 |
| | | | 707/756 |

OTHER PUBLICATIONS

U.S. Appl. No. 13/923,563, filed Jun. 21, 2013, Taylor, et al.
Tim Curless, "EMC's Next-Generation VNX (Part 3 of 4): Symmectric Active/Active Considerations," Sep. 10, 2013, http://thinkahead.com/emcs-next-generation-vnx-part-3-4-symmetric-activeactive-considerations/.
Tim Curless, "EMC's Next-Generation VNX (Part 3 of 4): Symmetric Active/Active Considerations," Sep. 10, 2013.

\* cited by examiner

OPTIMIZING COPY PROCESSING BETWEEN STORAGE PROCESSORS

BACKGROUND

Technical Field

This application generally relates to data storage, and more particularly to techniques used in connection with determining and performing data copying.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with data storage, a host may issue I/O operations to copy data from a source location on a source device to a destination location on a destination device. The source and destination devices may be on the same or different data storage systems. To perform the operation, the host may issue a read command to read the data to be copied from the source location of the source device from a source data storage system. In response, the source data storage system may send the requested data across a network connection to the host. The host may then issue a write command to a destination data storage system including the destination device. For the write operation, the host transmits the data to the destination data storage system whereby the destination data storage system writes the data to the destination location of the destination device.

SUMMARY OF THE INVENTION

In accordance with one aspect of the invention is a method of copying data comprising: receiving, at a first storage processor of a data storage system, a copy request to copy data including copying source data from a source area of a source logical device to a destination area of a destination logical device, wherein said source logical device is owned by the first storage processor of a data storage system and said destination logical device is owned by a second storage processor of the data storage system, said source logical device and said destination logical device being included in the data storage system; receiving, at the first storage processor from the second storage processor, destination location physical storage mapping information for the destination area on the destination logical device; determining, using the destination location physical storage mapping information, a destination physical device location corresponding to the destination area on the destination logical device; storing, in a first cache location of a first data cache of the first storage processor, the source data from the source area; modifying the first cache location to indicate that the first cache location includes write pending data for the destination physical device location; and destaging the source data from the first cache location to the destination physical device location. The method may include issuing a request from the first storage processor to the second storage processor for the destination location physical storage mapping information; receiving the request on the second storage processor and performing first processing comprising: acquiring, prior to performing said storing, a first lock that locks logical addresses on the destination logical device corresponding to the destination area to thereby provide exclusive access to the destination area. The method may include releasing the first lock subsequent to completing said storing. The method may include acquiring, prior to performing said storing, a second lock that locks logical addresses on the source logical device corresponding to the source area to thereby provide exclusive access to the source area. The method may include releasing the second lock subsequent to completing said storing. The destination physical device location is an offset on a physical device. The destination location physical storage mapping information may include RAID group information identifying a RAID group and a location in the RAID group corresponding to the destination area. The RAID group information may be expressed in terms of a private logical device location mapped to the destination physical device location which is a location on a physical device, wherein the private logical device location may be a location on a private logical device used internally in the data storage system. The method may include obtaining by the first storage processor source location physical storage mapping information for the source area on the source logical device; and determining, using the source location physical storage mapping information, a source physical device location corresponding to the source area on the source logical device, wherein said first storage processor uses the source physical device location to read the source data stored in the first cache location. The first storage processor owning the source logical device may indicate that only the first storage processor is able to process I/O operations directed to the source logical device, and wherein the second storage processor owning the destination logical device may indicate that only the second storage processor is able to process I/O operations directed to the second logical device. Only the first storage processor and not the second storage processor may read data from and write data to physical storage provisioned for the source logical device. Only the second storage processor and not the first storage processor may read data from and write data to physical storage provisioned for the destination logical device. The copy request may be sent by a host to the data storage system. The source logical device and the destination logical device may be any of a virtually provisioned logical device and a thick logical device. The copy request may be sent by a component internal with the data storage system. The copy request may be a single transaction and one of the first storage processor and the second storage processor may fail prior to completing the single transaction, wherein a remaining one of the first and second storage processors that has not failed may then perform first processing that includes either aborting or completing the copy request and assuming processing responsibilities of the one storage processor that failed.

In accordance with another aspect of the invention is a data storage system comprising: a first storage processor and a second storage processor; a memory comprising code stored therein that, when executed, performs a method of copying data comprising: receiving, at the first storage processor, a copy request to copy data including copying source data from a source area of a source logical device to a destination area of a destination logical device, wherein said source logical device is owned by the first storage processor of a data storage system and said destination logical device is owned by the second storage processor, said source logical device and said destination logical device being included in the data storage system; receiving, at the first storage processor from the second storage processor, destination location physical storage mapping information for the destination area on the destination logical device; determining, using the destination location physical storage mapping information, a destination physical device location corresponding to the destination area on the destination logical device; storing, in a first cache location of a first data cache of the first storage processor, the source data from the source area; modifying the first cache location to indicate that the first cache location includes write pending data for the destination physical device location; and destaging the source data from the first cache location to the destination physical device location.

In accordance with another aspect of the invention is a non-transitory computer readable medium comprising code stored thereon that, when executed, performs a method of copying data comprising: receiving, at a first storage processor of a data storage system, a copy request to copy data including copying source data from a source area of a source logical device to a destination area of a destination logical device, wherein said source logical device is owned by the first storage processor of a data storage system and said destination logical device is owned by a second storage processor of the data storage system, said source logical device and said destination logical device being included in the data storage system; receiving, at the first storage processor from the second storage processor, destination location physical storage mapping information for the destination area on the destination logical device; determining, using the destination location physical storage mapping information, a destination physical device location corresponding to the destination area on the destination logical device; storing, in a first cache location of a first data cache of the first storage processor, the source data from the source area; modifying the first cache location to indicate that the first cache location includes write pending data for the destination physical device location; and destaging the source data from the first cache location to the destination physical device location.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
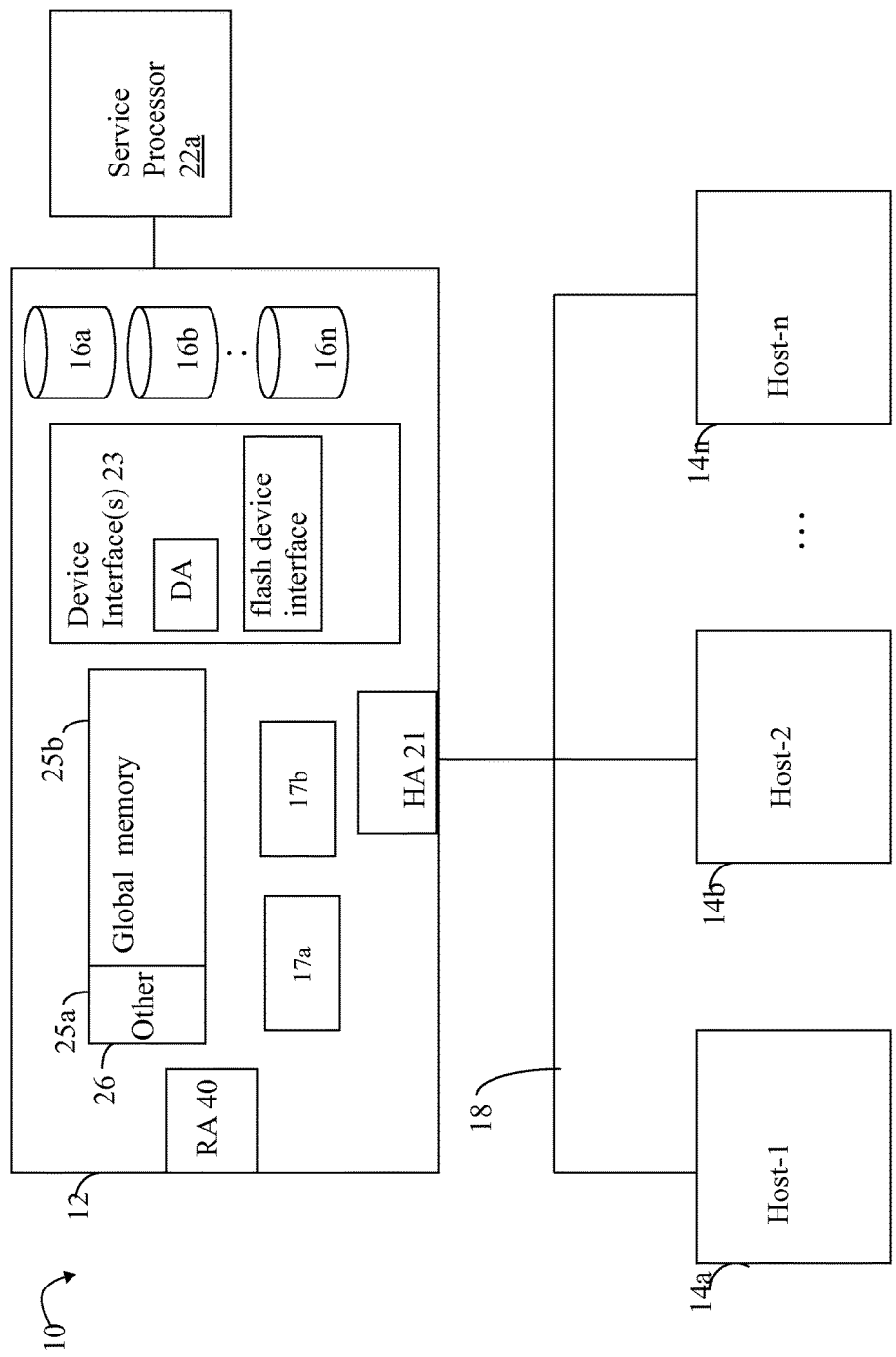
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system may be a single unitary data storage system, such as single data storage array, including two or more main storage processors or computer processing units (CPUs). Techniques herein may be more generally use in connection with any one or more data storage system each including a different number of main storage processors than as illustrated herein. The data storage system 12 may be a data storage array, such as a VNX® data storage array by EMC Corporation of Hopkinton, Mass., including a plurality of data storage devices 16a-16n and two main storage processors or CPUs 17a, 17b. The storage processors 17a, 17b may be CPUs included in the data storage system for processing requests and commands. In connection with performing techniques herein, an embodiment of the data storage system may include multiple storage processors including more than two main CPUs 17a, 17b as described. The VNX® data storage system mentioned above may include two main storage processors 17a, 17b for performing processing in connection with servicing requests. Additionally, the two main storage processors 17a, 17b may be used in connection with failover processing when communicating with the management system 16. More generally, a data storage system may include one or more such main CPUs such as 17a, 17b.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

A LUN may be one of possibly multiple supported logical device types. For example, in one embodiment a LUN may be thin, virtually provisioned LUN or a thick LUN. A thick LUN may be characterized as a regular LUN where all physical storage for the LUN is provisioned when the LUN is created. In contrast, a thin LUN may have a user data storage capacity with a corresponding logical address space. With a thin LUN, physical storage associated with a subrange or portion of the logical address space may be provisioned in response to a first write to a logical address in the subrange or portion. In this manner, physical storage for a thin LUN is not provisioned when the LUN is created but may be rather provisioned in individual allocation size units also referred to as chunks or slices. The allocation unit may generally be any suitable size. With a thick LUN, physical storage is provisioned for the LUN's entire logical address space when the LUN is created. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs) 17a, 17b. Each of the SPs 17a, 17b may be a CPU including one or more "cores" or processors and each may have their own memory used for communication between the different front end and back end components rather than utilize a global memory accessible to all storage processors. In such embodiments, memory 26 may represent memory of each such storage processor.

Figure 2:
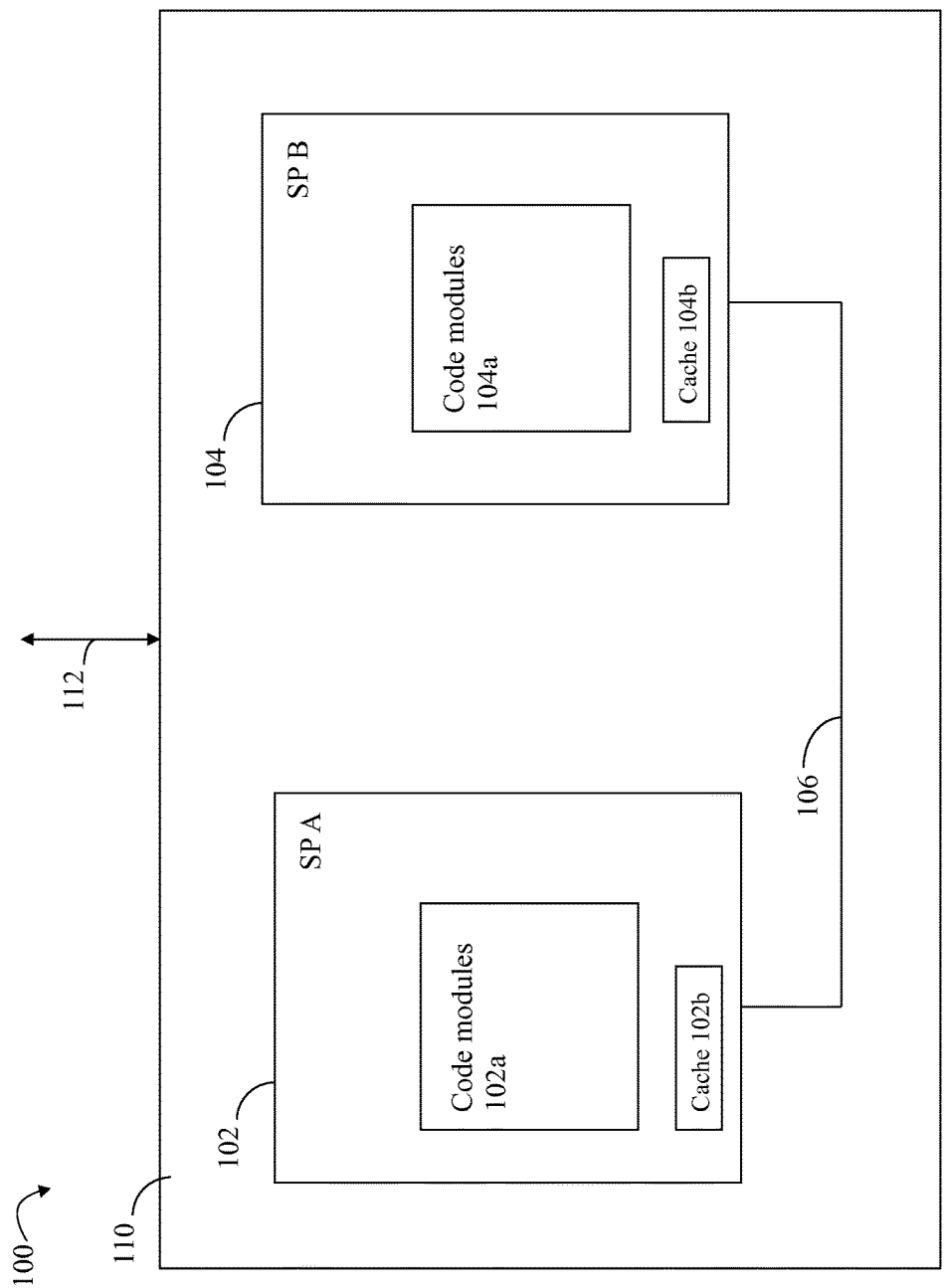
FIG. 2 is an example of messages that may be exchanged between a host and data storage system in an embodiment in accordance with techniques herein.

Referring to FIG. 2, shown is a block diagram of components that may be included in a data storage system 110. In the example 100, there are two SPs 102, 104 although a data storage system and techniques herein may be used in an embodiment in which the data storage system includes more than two SPs. SP 102 may include a set of code modules 102a executing thereon and SP 104 may include a set of code modules 104a executing thereon. Each SP may also have their own hardware components not all of which are illustrated herein. For example, SP A 102 may have its own data cache 102b and SP B 104 may have its own data cache 104b. Each of 102b and 104b may represent the cache generally described elsewhere herein. For example, data may be read from a physical device (PD) by a DA and stored in the cache 102b or 104b. Write data received by SP A may be stored in cache 102b and then later destaged to a PD. Similarly, write data received by SP B may be stored in cache 104b and then later destaged to a PD.

SP 102 and SP 104 may communicate using an internal communication connection (e.g., inter-SP communication connection) 106 which is described in more detail below. Element 112 may represent one or more communication connections between the data storage system 110 and one or more external clients, such as one or more hosts whereby the hosts may issue commands to the data storage system 110 over one or more of the connections 112.

The two SPs 102, 104 may control the operation of the data storage system. The SPs may each be configured to process requests as may be received from the hosts, other data storage systems, management system, and other components connected thereto. Each of the SPs 102, 104 may process received requests and operate independently and concurrently with respect to the other SP. In the example 100, each SP is illustrated as having one or more code modules executing thereon. As described in more detail below, an embodiment in accordance with techniques herein may have the same set of one or more software modules executing on each SP so that either of the SPs 102, 104 may service a received request.

The connection 106 may be a bus or other communication connection to facilitate inter-SP communication between the SPs 102, 104. The connection 106 may be characterized as internal to the data storage system or local with respect to residing on the data storage system. The connection 106 may be characterized as part of a data storage system internal network over which inter-SP communications may occur. Thus, one of the SPs may use connection 106 to communication with the other SP. As will be described in more detail in following paragraphs, each SP may include code which facilitates communication with the other SP using the connection 106 for inter-SP communication.

As mentioned above, the processors 102, 104 may also communicate over connection 112 with hosts or external clients. The connection 112 may represent a TCP/IP or other network connection.

In a data storage system having multiple SPs such as described above in connection with FIG. 2, the SPs may have a concept of ownership with respect to a particular in the data storage system. An SP that is deemed an owner of a LUN is the single SP that can perform an operation or I/O against that LUN, The SP that owns a LUN may be the only SP that can read data from, and data write, to physical storage provisioned for the LUN.

In one embodiment as described herein such as with the VNX® data storage system by EMC Corporation, multiple SPs, such as SP A and SP B, may provide for failover processing. Upon the failure of one of the SPs, the remaining peer SP may perform processing on behalf of the failed SR In order to accomplish the failover whereby the remaining healthy SP assumes processing on behalf of the failed SP, the data storage system may perform ongoing processing whereby sufficient information is saved by each SP regarding its current state, I/O operations, and the like, in order for the remaining SP to resume responsibilities of the failed SP. For example, upon failure of SP A, SP B handles servicing all I/Os directed to LUNs owned by the failed SP A. In such an embodiment, for example, write data stored in a first data cache of a first SP may be automatically mirrored or copied to the other SP's data cache. For example, WP data stored in cache 102b of SP A may be automatically copied or mirrored to cache 104b of SP B. Similarly, WP data stored in cache 104b of SP B may be automatically copied or mirrored to cache 102b of SP A.

In connection with a data storage system, one operation that may be performed is to copy data from a source area to a destination area whereby both of the foregoing may be included in the same data storage system. Generally, the source area may comprise one or more source ranges each corresponding to a possibly different LBA (logical block address) range of a source device (e.g., LUN). In a similar manner, the destination area may comprise one or more destination ranges each corresponding to a possibly different LBA range of a destination device (e.g., LUN). Each of the source ranges may be on the same or a different source device than other source ranges, and each of the destination ranges may be on the same or a different destination device than other destination ranges. Furthermore, the copy operation may result from an originating request within the data storage system (e.g., data storage system internally generated the copy operation) as well as external from the data storage system (e.g., issued by an external client such as a host). The copy operation may also be referred to as a bulk copy operation due to the data portions copied from possibly many disparate different source logical address locations of source devices (e.g., the source area) to possibly many disparate different destination logical address locations of destination devices (e.g., the destination area). In one embodiment, each source range for a particular source device may be expressed using a starting offset and length whereby starting offset denotes the starting offset of the source range on the particular source device and the length denotes the size or span of the source range. Each source range (expressed using a starting offset and length) and associated source device may be specified as a triple or set of location information including the source device, starting offset and length. In a similar manner, each destination range (expressed using a starting offset and length) and associated destination device may be specified as a triple or set of location information. In an embodiment in accordance with techniques herein, the size of the data portion identified by each such triple or set of location information may differ. However, the total length or size represented by all triples of the source area may match the total length of size represented by all triples of the destination area. Alternatively, an embodiment may not require the total length or size of the source area to match the total length or size of the destination area and may perform additional processing in the case when the foregoing lengths do not match. Such rules may vary with embodiment and processing may vary with embodiment.

In following paragraphs, examples illustrate techniques herein with a request to perform a copy operation originating from a client, such as a host, that is external with respect to the data storage system whereby the source and destination areas of the copy operation are included in the same data storage system. The host may issue the request to copy data from the source area to the destination area within the same data storage system. The foregoing source and destination areas may be located on the different devices (e.g., different LUNs) in the same data storage system, such as the same data storage array.

Generally, the copy operation request from the host that may be used in connection with techniques herein may be any suitable command, such as any SCSI standard command, to perform a block level copy operation. Such a command may request or instruct the data storage system to generally perform an offload copy command internal within the data storage system because the source and destination of the copy command are within the same data storage system. Described in following paragraphs are techniques that may be used in connection with optimizing performing such a copy operation from a source device to a destination device within the same data storage system. The source device may be a logical device, also referred to herein as a source LUN owned by one of the SPs and the destination device may be a logical device, also referred to herein as a destination LUN owned by the other peer SP. For simplicity, it is assumed that the copy command includes a single source area identified by the source LUN with a starting offset or LBA on the source LUN, and a length or size identifying the amount of data to be copied. It is also assumed for simplicity of illustration that the copy command includes a a single destination area identified by the destination LUN with a starting offset or LBA on the destination LUN and a length the same as the source area.

Figure 3:
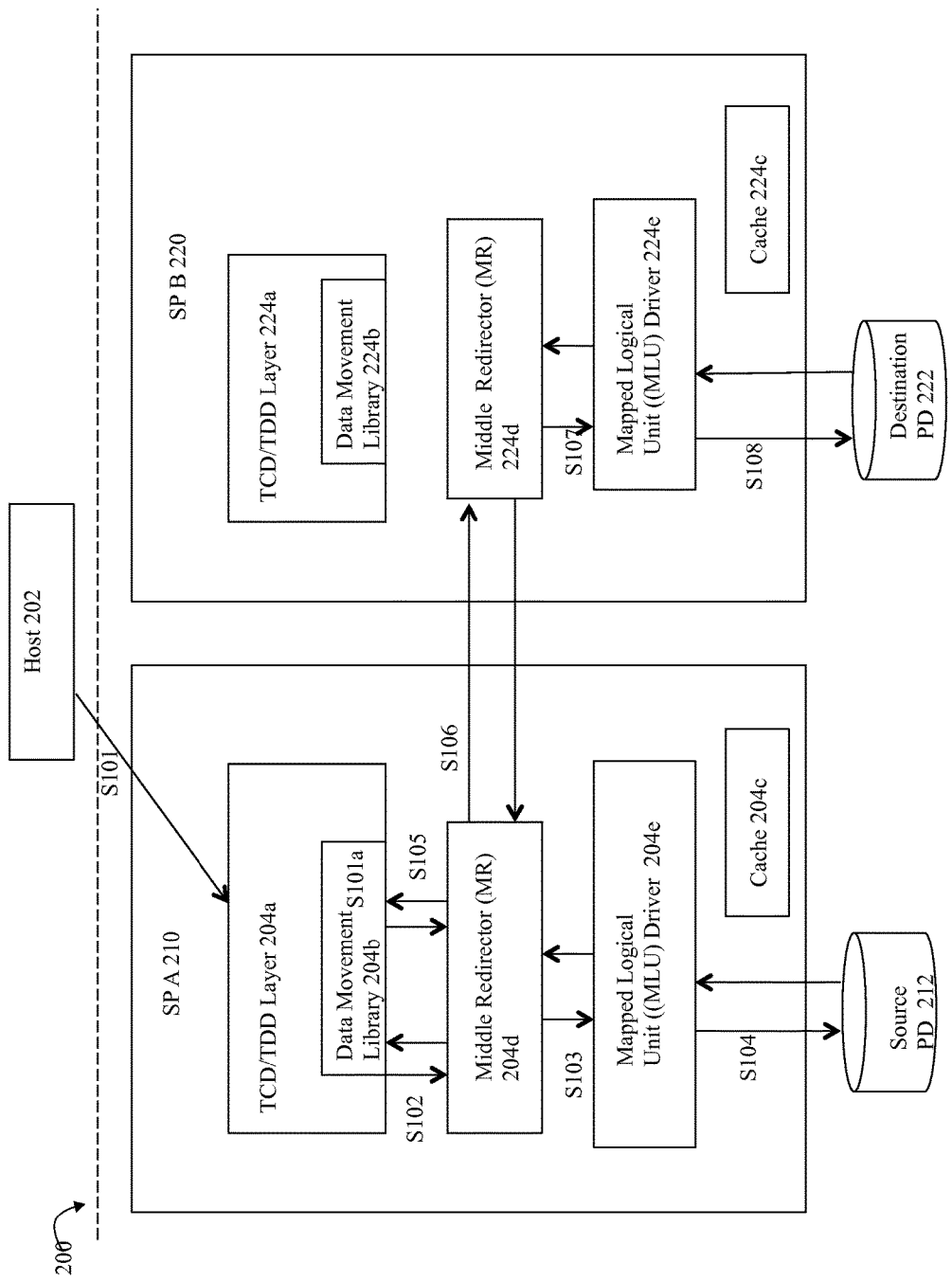
FIG. 3 is an example illustrating processing and associated data flow performed in a data storage system.

Referring to FIG. 3, shown is an example illustrating components of a data storage system in connection with performing an internal copy operation within the data storage system without using techniques herein. In the example 200, all components below the dashed line are within the data storage system including SP A 210, SP B 220, source PD 212 and destination PD 222. The source PD 212 may represent the PD from which storage is provisioned for the source LUN of the copy request. The destination PD 222 may represent the PD from which storage is provisioned for the destination LUN of the copy request. Thus, the source PD 212 is the PD from which data is copied to a destination location on the destination PD 222 in accordance with the copy request received in step S1 described below. It should be noted that FIG. 3 includes only some components of the data storage system described herein for purposes of simplicity of illustration.

SP A 210 may include data cache 204c and multiple software layers including 204a, 204b, 204d and 204e wherein 204a, 204b, 204d and 204e may be included in the code modules 102a represented in FIG. 2. SP B 220 may include data cache 224c and multiple software layers including 224a, 224b, 224d and 224e wherein 224a, 224b, 224d and 224e may be included in the code modules 104a represented in FIG. 2.

With reference to SP A 210, the Target Class Driver and Target Disk Driver (TCD/TDD) layer 204a generally provides SCSI target support. A data movement (DM) library 204b may be included in layer 204a. SP A 210 may include a middle redirector (MR) driver that performs processing, for example, in connection with I/O forwarding between SP A and SP B for a variety of different purposes and uses some of which are described herein. Such I/O forwarding or redirecting may be performed using internal SP communication connections within the data storage system such as 106 of FIG. 2. SP A 210 may also include a mapped logical unit (MLU) driver 204e. MLU 204e may perform processing, for example, including translating or converting a logical address, such as a source LUN and source LUN offset, into its corresponding physical storage mapping information. In one embodiment, the physical storage mapping information may identify a RAID group and a offset or location within the RAID group at which data is stored. Generally, a RAID group may have an associated logical address range denoting the storage capacity of the RAID group to store user data of provisioned LUNs. The RAID group and logical offset may be further mapped to a particular PD and PD location (on that particular PD) within the RAID group. Although not illustrated, other layered drivers, and other services or processing, may be included in the illustrated runtime stack or layers of modules in SP A 210.

SP B 220 may include layers similar to that as described in connection with SP A 210. With reference to SP B 220, the TCD/TDD layer 224a, DM library 224b, MR 224d and MLU 224e are respectively similar to TCD/TDD layer 204a, DM library 204b, MR 204d and MLU 204e of SP A.

In the example 200, the host 202 issues in step S101 the copy command that is an offload copy command as described above requesting to perform a data storage system internal copy operation from a source area to a destination area, or more specifically from a source LUN having storage provisioned on source PD 212 to a destination LUN having storage provisioned on destination PD 222. In this example, the source LUN is owned by SP A 210 and the destination LUN is owned by SP B 222.

The copy command in step S101 is received by SP A 210 of the data storage system. It should be noted that the command may be received by either SP (e.g., the copy command of S101 could have also been received by SP B 220).

The TCD/TDD layer 204a converts or translates the received copy command into another representation of information used internally with the data storage system to perform the copy. The TCD/TDD layer 204a calls into the DM library 204b that tries to perform the requested copy in several ways. Generally S101a represents the processing steps performed by the DM library 204b in implementing the copy request. The DM library 204b may first try to perform a data movement (DM) IOCTL command which requires that both source LUN and destination LUN be owned by the same SP A. Thus, in this particular case, the DM IOCTL command cannot be used for the copy operation of S11. With the DM IOCTL command not illustrated, commands are sent down the runtime stack of layers through MR 204d to MLU 204e to read the data from the source PD 212 into cache 204c of SP A, mark the data as WP, and note in cache 204c that the WP data is to be written out or destaged to the location on the destination PD 222 corresponding to the destination LUN. In this manner, the WP data in the cache 204c may be destaged by the DA to the destination PD 222 in the typical way in an asynchronous matter at a later point in time.

If the DM library 204b determines that the copy cannot be performed using the DM IOCTL such as noted above, the DM library 204b may try to perform the requested copy in one or more alternative but less efficient ways. For example, in this case with the copy request, the MR 204d may determine that the source and destination LUNs are owned by different SPs and so inform the DM library 204b which then tries one or more alternatives to implement the requested copy. In this case, the DM library 204b tries one or more alternatives and may perform the requested copy operation using one of these alternatives that will now be described. To implement the requested copy operation, processing is performed in S102, S103 and S104 to read the requested data from the source PD 212 and return the requested data to the MR 204d. In step S102, the DM Library 204b sends a read request to read the source data from the source LUN to MR 204d. The read request is passed from the MR 204d to MLU 204e in step S103. In step S104, the source data is read from the source PD 212 and returned backup through the call chain to 204e and 204d. Once the source data has been read and returned to MR 204d, control is returned to the DM library 204b which then issues in step S105 a command to write the source data to the appropriate location on the destination LUN. In step S106, the MR 204d redirects the write request to accomplish the write to SP B that owns the destination LUN. In step S106, MR 204d of SP A sends a request to write the data to the destination LUN at the specified location to MR 224d of SP B. In turn, MR 224b issues the write request in steps S107 and S108 that writes the source data to the appropriate location on the destination PD 222 (on which storage is provisioned for the destination LUN).

In summary, the DM library 204b may sequence through possible alternative ways in which the requested copy operation may be performed. The DM library 204b may attempt such alternatives in an ordering from most to least efficient whereby the command may be implemented using the most efficient way possible. In the case of the copy command described herein where the source and destination LUNs are owned by different SPs, a copying technique may be performed as illustrated in FIG. 3 by steps S101-S108 by redirecting the write to the peer SP B that owns the destination LUN. In this case, step S106 includes sending the data to be copied over the inter-SP connection (such as 106 of FIG. 2) which is an expensive operation in terms of performance, resource consumption, and the like.

Rather than perform processing such as described in connection with FIG. 3, an embodiment of a data storage system may alternatively perform processing in accordance with techniques herein that will now be described below such as with reference to FIG. 4. As described below, techniques of FIG. 4 provide for redirecting only destination mapping information between SPs whereby such metadata is transferred between SPs rather than the actual source data to be written/copied to the destination area.

Figure 4:
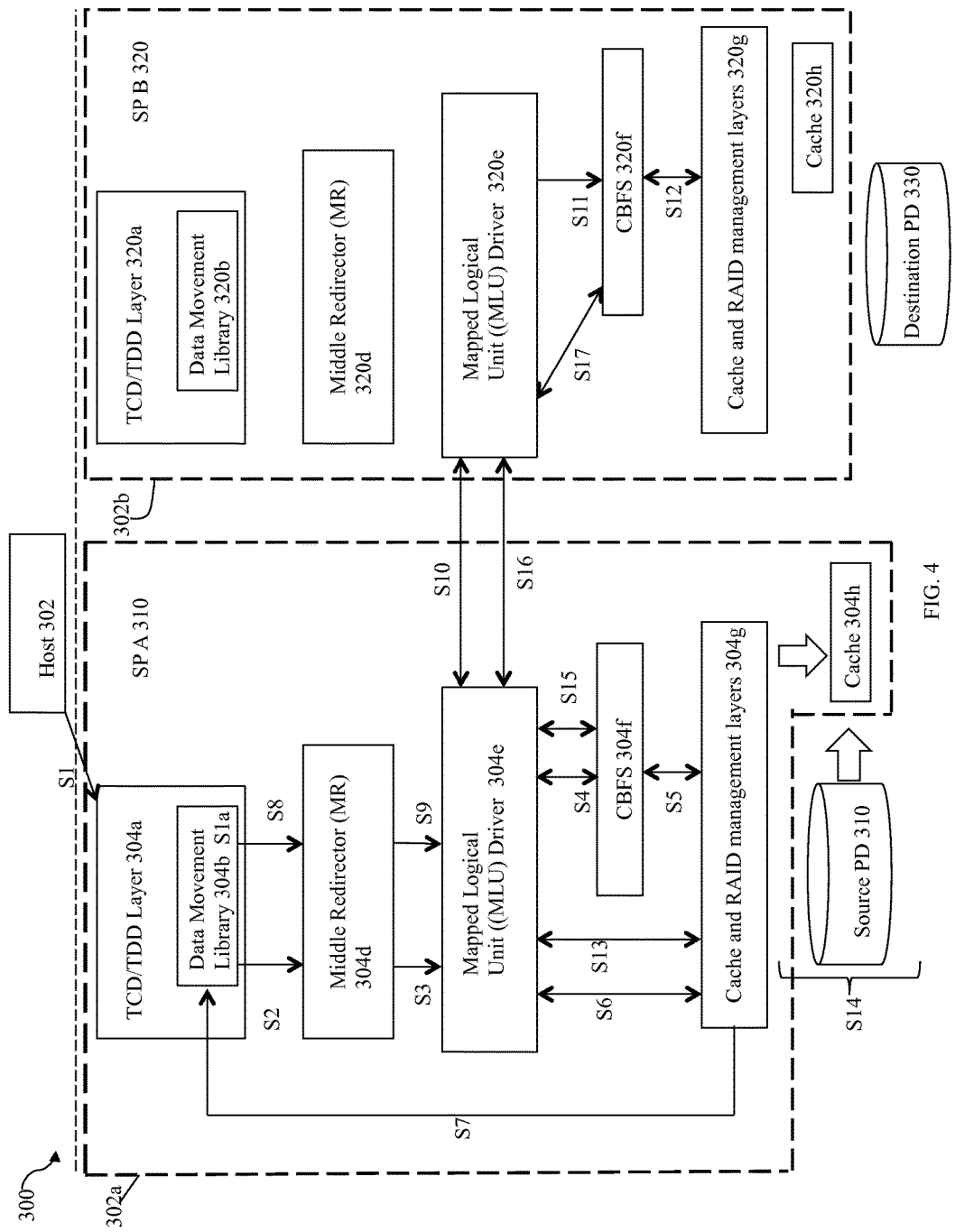
FIG. 4 is an example illustrating processing and associated data flow performed in a data storage system in accordance with techniques herein.

Referring to FIG. 4, shown is an example 300 illustrating components of a data storage system in connection with performing an internal copy operation within the data storage system in accordance with techniques herein. In the example 300, all components below the dashed line are within the data storage system including SP A 210, SP B 220, source PD 212 and destination PD 222. All components within dashed shape 302a (e.g., 304a, 304b, 304d, 304e, 304f, 304g and 304h) may be included in SP A 310 and SP A 310 may own the source LUN as noted above. Components 304a, 304b, 304d, 304e, and 304h of SP A are respectively similar to 204a, 204b, 204d, 204e and 204h of SP A 210 of FIG. 3. All components within dashed shape 302b (e.g., 320a, 320b, 320d, 320e, 320f, 320g and 320h) may be included in SP B 320 and SP B 320 may own the destination LUN as noted above. Components 304a, 304b, 304d, 304e, 304h of SP A 310 are respectively similar to 204a, 204b, 204d, 204e and 204h of SP A 210 of FIG. 3. Source PD 310 and destination PD 330 are respectively similar to 212 and 222 of FIG. 3.

Additionally, SP A 310 is illustrated as including CBFS (Common Block File System) 304f and Cache and RAID management layers 304g and SP B 320 similarly includes CBFS 320f and Cache and RAID management layers 320g. It should be noted that SP A and SP B of FIG. 3 may each also include a CBFS and Cache and RAID management layers which were not illustrated in FIG. 3 for simplification. Steps S1 and S1a of FIG. 4 are respectively similar to steps S101 and S101a of FIG. 3. In step S1, the host issues a copy command to copy data from a source LUN to a destination LUN where both the foregoing LUNs have their physical storage provisioned on the same data storage system of the example 300. The source LUN may have its storage provisioned from source PD 310 and the destination LUN may have its storage provisioned from destination PD 330. Thus, the copy operation is a request to read data from a source LUN location (denoting the source area) that is mapped to a location of the source PD 310. The data is then written or copied to a location of the destination LUN (denoting the destination area) which maps to a destination location on the destination PD 312. As noted above, the DM library 304b may perform processing to try and implement the requested copy operation using the most efficient technique. As noted above, such processing may first attempt to perform a DM IOCTL which fails since the source LUN and the destination LUN are owned by different SPs. Using techniques herein, different processing may be performed from that described in connection with FIG. 3 where such techniques illustrated in FIG. 4 are more efficient and less costly in terms of data storage system resources and processing time since rather than send the data to be written using an inter SP communication connection (as in FIG. 3), techniques in following paragraphs perform processing illustrated in FIG. 4 where the physical storage mapping information of the destination area (e.g., destination LUN and associated destination offset) is returned to the SP that owns the source LUN. Such techniques avoid copying the source LUN data and passing such data between SP A (that owns the source LUN) and SP B (that owns the destination LUN).

In step S2, the DM library 304b issues a DM SRC command to MR 304d to obtain the requested source data. The DM SRC command identifies the source area of the data movement that is a source location is expressed in terms of source LUN logical addresses (e.g., the source LUN and location or LBA on the source LUN.) In step S3, the DM SRC command is forwarded from MR 304d to MLU 304e. In step S4, MLU 304e issues a map for read (MFR) request to CBFS 304f for the physical storage mapping information of the source LUN and source LUN location from which data is to be copied.

CBFS 304f may generally perform metadata management for LUNs owned by SP A 310. CBFS 304f may perform processing for LUNs owns by SP A 310 such as, for example, management of storage allocation for LUN slices or data portions where each such slice or data portion is stored on physical storage. CBFS 304f may handle the logical mapping of a LUN's logical address space to physical storage. In this manner. CBFS 304f may have the mapping information regarding the mapping of the source LUN to physical storage. In one embodiment, the physical storage mapping information may identify a RAID group and location within the RAID group at which the LUN's data is stored. Further mapping of the RAID group and location to the PD location may be performed by another lower layer, such as the RAID management layer of 304g. In some embodiments, one or more additional logical layers may exist between the source LUN the RAID group layer. For example, in such an embodiment, a RAID group may be configured into one or more private LUNs referenced internally in the data storage system. Such private LUNs may not be exposed to the host. Such private LUNs may be partitioned into a pool of multiple slices or chunks and the host-based LUN, such as the source LUN, may have its storage provisioned from this pool of slices (e.g., based on top of the private LUN layer). In this manner, for example, when a source LUN is thin or virtually provisioned, chunks or slices of storage may be allocated from the slice pool as first writes are performed to different LBAs of the source LUN or host-based LUN. The CBFS 304f and 320f may each perform management of such information mapping the source LUN and source LUN location to a corresponding private LUN and private LUN location identifying the associated physical storage provisioned or mapped to the source LUN and source LUN location. In such an embodiment, the request may include a source area expressed in terms of the source LUN and source location where the source LUN is a host-based LUN as just described. For a source area expressed as a source LUN, starting source LUN location, and offset or length (identifying the length or size of the source area), the physical storage mapping information may identify the corresponding private LUN, starting private LUN location and offset or length. Similarly, the destination area may be expressed using a destination LUN and destination location expressed in terms of a host-based LUN. For a destination area expressed as a destination LUN, starting destination LUN location, and offset or length (identifying the length or size of the destination area), the physical storage mapping information may identify the corresponding private LUN, starting private LUN location and offset or length.

Before proceeding further with FIG. 4 processing, the physical storage mapping information including RAID group information is described in more detail.

Figure 5:
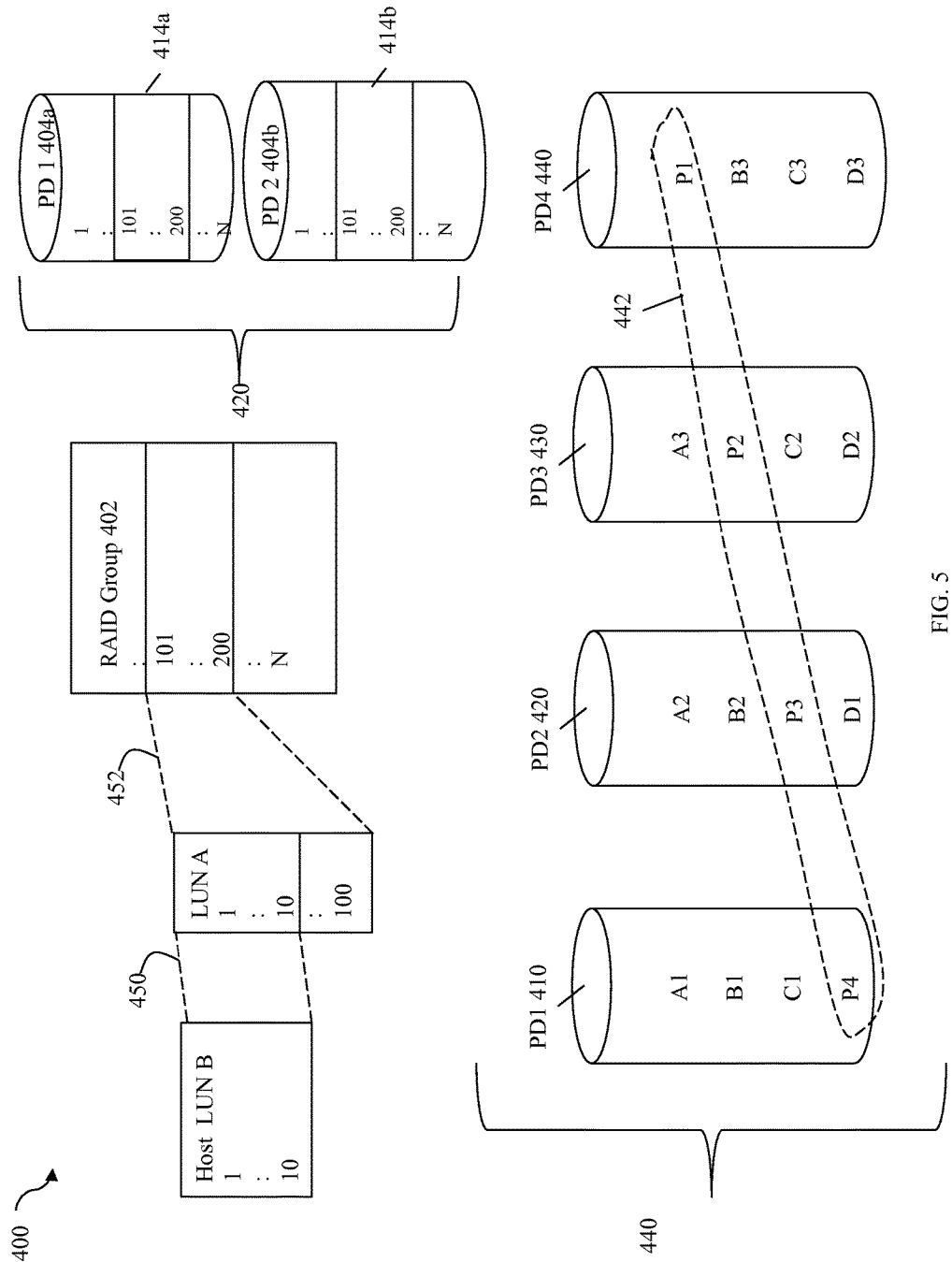
FIG. 5 is an example illustrating mappings between logical device locations, RAID group locations and physical device locations in an embodiment in accordance with techniques herein.

Referring to FIG. 5, shown is an example 400 illustrating mapping of RAID group information to PD information that may be performed in an embodiment in accordance with techniques herein. In the example 400, LUN B may be a host LUN that is 10 units, such as blocks or LBAs. LUN A may be private LUN as described above and in this example LUN A may be 100 units, such as blocks or LBAs. The RAID group 402 may generally be configured as one or more private LUNs one of which is private LUN A. Host LUN B having 10 LBAs may map 450 to 10 LBAs of private LUN A. Private LUN A having 100 LBAs may map 452 to logical storage location 101-200 of RAID group 402. RAID group 402 may have storage capacity of N blocks or LBAs. Thus, 402 represents a logical address range of the RAID group. For example, host LUN B, LBA 1 may be mapped to private LUN A, LBA 1. LUN A LBA 1 may be mapped to RAID group location or LBA 101 which may then be further mapped to a particular PD location that varies with the particular underlying physical RAID configuration. For example element 420 illustrates a RAID-1 configuration of two PDs 404a and 404b. With RAID-1, there is mirroring of the data without any parity. In this example, LBAs 1 through N of the RAID group 402 may be respectively mapped to physical storage blocks 1 through N of PD 1 404a and also to physical storage blocks 1 through N of PD2 404b. For example, private LUN A, LBA 1, has its data stored on PD 1 404a, physical block location or offset 1 and also on PD 2 404b at physical block location or offset 1. Thus, writing to host LUN B, LBA 1 results in writing to private LUN A, LBA 1 which includes writing such data to both of the foregoing locations on 404a and 404b. However, a read of LUN B, LBA 1 results in reading from LUN A, LBA 1 whereby the read may be serviced by reading from either one of 404 and 404b.

Element 440 illustrates a RAID-5 group includes multiple PDs 410, 420, 430 and 440 providing protection from a single PD failure with block level striping and distributed parity information. In the example 440, the RAID-5 group includes 3 data devices and 1 parity device. Such a RAID group includes 4 PDs 410, 420 430 and 440, having a layout where the parity information, P1-P4, is distributed across the various PDs. User data and parity information may be striped across the 4 PDs in rows or stripes as illustrated. For example, a first row may include data A1, A2 and A3 with corresponding parity information P1, a second row may include data B1, B2 and B3 with corresponding parity information P2, a third row may include data C1, C2 and C3 with corresponding parity information P3, and a fourth row may include data D1, D2 and D3 with corresponding parity information P4. When a write is performed to store data on one of the data devices, such as write A1, the parity information P1 is also updated. To calculate parity information P1, user data A1, A2 and A3 of the same row must be read. Thus, in order to write data A1 of a single PD, data portions A2 and A3 in the same row are needed thereby incurring additional reads of A2 and A3 to recalculate the parity P1 when writing data A1. Thus, a write is accomplished in RAID-5 by writing the user data and also writing updated parity information. Reading is accomplished by reading the requested data from the appropriate one of the PDs 410, 420, 430 and 440 depending on the particular location or LBA within the RAID group.

In one embodiment, the physical storage mapping information, or more generally, mapping information maintained by the CBFS may be expressed in terms of the private LUN level such as private LUN LBA locations. Lower layers of the data storage system, such as RAID management layers, may then map the private LUN information to lower level RAID group information for the corresponding PD location information (such as represented at layer 420, 440) to accomplish the required write or read operation. The particular PD location may vary depending on the RAID group configuration as illustrated by 420 and 440. As an alternative, the physical storage mapping information, or more generally, mapping information maintained by the CBFS may be expressed in terms of the RAID group level such as illustrated by 402. Lower layers of the data storage system, such as RAID management layers, may then map the RAID group information to the corresponding PD location information (such as represented at layer 420, 440) to accomplish the required write or read operation. The particular PD location may vary depending on the RAID group configuration as illustrated by 420 and 440.

Returning again to FIG. 4, as noted above, in step S4, an MFR request is issued from MLU 304e to the CBFS 304f for the physical storage mapping information, or more generally mapping information, of the source area of the copy operation. As described above, in one embodiment the source area physical storage mapping information may be expressed in terms of RAID group information identifying a private LUN and logical locations or offsets in the private LUN corresponding to the source area. As an alternative as also discussed above, the source area physical storage mapping information may be expressed in terms of RAID group information identifying the RAID group and logical offsets or locations in the RAID group. More generally, the source area physical storage mapping information may be expressed in any of the foregoing forms or another suitable form understood in an embodiment depending on the particular logical layers used by the data storage system. In following paragraphs, it is assumed that the source area physical storage mapping information is expressed in terms of RAID group information identifying a private LUN and logical locations or offsets in the private LUN corresponding to the source area.

CBFS 304f may have an internal caching layer (not illustrated). Thus, CBFS 304f may determine if the requested mapping information is stored in the internal CBFS cache. If so, the requested mapping information for the source area may be returned to the MLU 304e. If not, step S5 may be performed where a request for the mapping information is made to the cache and RAID management layers 304g, cached in the internal cache of CBFS 304f and returned to MLU 304e.

Additionally, step S4 may result in locking a suitable range of the source LUN's logical address space while performing the copy operation. Such locking may provide exclusive access to such locked range of the source LUN for use in connection with performing processing as described herein. For example, if such a lock on the source LUN's logical addresses as denoted by the source area of the copy command is not obtained, another process may write to the source LUN at the same time the copy operation from step S1 is in progress.

At this point, MLU 304e has translated the source area expressed in terms of a source LUN logical address into its corresponding RAID group information as indicated in the source area's physical storage mapping information returned by completing steps S4 and S5. As noted above in one embodiment, such RAID group information may be expressed in terms of a private LUN and logical locations or offsets in the private LUN corresponding to the source area. For example, in one embodiment, the mapping information may be a private LUN, starting location on the private LUN, and length corresponding to the source area. Layers above 304e in the illustrated call stack operate using source and destination areas expressed in terms of host-based LUNs and logical addresses or LBAs on the host-based LUNs (e.g. such as LUN B of FIG. 5). Layer 304e may be characterized as exposing host-based LUN locations which may be mapped to corresponding private LUN locations by layer 304e. Layer 304g may expose private LUNs and private LUN locations which may be mapped to the raw RAID group locations such as the PD locations.

In step S6, the MLU 304e then provides the mapping information for the source area to the cache and RAID management layers 304g. Element 304g may collectively represent multiple layers that perform cache management (of cache 304h) and RAID group management for LUNs owned by SP A 310. Layers 304g may further map or convert the RAID group information of the source area (e.g., private LUN and private LUN location(s)) to corresponding PD location information (e.g., PD and location(s) on the PD) such as illustrated in FIG. 5.

In step S7, the cache and RAID management layers 304g may issue a DM rendezvous request to the upper layer DM library 304b to now pass down the destination location to which the source data is copied. Additionally, with the request of step S7, the cache and RAID management layers 304g of SP A 310 is effectively claiming that it is handling the DM SRC command (e.g., from S2 and S3) for the data movement. In response to S7, the DM library 304b sends, in step S8, the DM DST which is the destination area of the data movement that is a destination location expressed in terms of logical addresses of the destination LUN (e.g., a destination LUN and location or LBA on the destination LUN). As with the source LUN, the destination LUN and locations thereon refer to a host-based LUN and host-based LUN locations.

In step S9, MR 304e passes the DM DST command to the MLU 304e to obtain the corresponding destination location physical storage location mapping information. MLU 304e determines that the DM DST is a write to a destination LUN owned by the peer SP, SP B. In this case, MLU 304e of SP A 310 performs processing for a proxy write. In step S10, a request is issued from MLU 304e of SP A to MLU 320e of SP B for the destination location mapping information. In step S11, a map for write (MFW) request is sent from MLU 320e to CBFS 320f for the mapping information of the destination location. In a manner similar to that as described above in connection with CBFS 304f of SPA, the requested mapping information may be located in the internal cache of CBFS 320f. If so, the requested mapping information denoting the destination location is returned to MLU 320e of SPB. Otherwise, step S12 is performed which is similar to step S4 with the difference that the request is for the mapping information for the destination location identified by the destination area. The requested destination location physical storage mapping information is returned back up the call chain (e.g., returned back up the path denoted by S12, S11, S10) whereby control is returned to MLU 304e of SP A from which S10 originated.

Additionally, step S11 may result in locking a suitable range of the destination LUN's logical address space while performing the copy operation. Such locking may provide exclusive access to the locked range of the destination LUN for use in connection with performing processing as described herein.

At this point, MLU 304e of SPA has the mapping information for destination location and step S13 is performed in which MLU 304e of SPA provides the destination location mapping information to the cache and RAID management layers 304g. As described elsewhere herein, the mapping information provided to 304g may be expressed in terms of RAID group information identifying a private LUN (of a RAID group) and location(s) on the private LUN corresponding to the destination area. Such RAID group information may then be further mapped to PD location information.

At this point, the cache and RAID management layers 304g have the PD locations of both the source and destination of the copy operation and issue a request to read the requested data from the source PD 310, store the data in cache 304h and mark such data as WP with the write target location to be the PD location on the destination PD 330 corresponding to the destination location. At some later point, the WP data is destaged from cache to the destination PD 330.

It should be noted that the particular cache 304h or 320h from which the WP data is destaged to the destination PD 330 may vary with embodiment and configuration.

As noted above, steps S4 and S11 include obtaining locks on suitable ranges of the source LUN and destination LUN as denoted, respectively, by the source area and destination area of the copy request received in S1, while performing the copy operation. An embodiment in accordance with techniques herein may handle the processing for the copy operation as a single transaction whereby either the entire transaction is completed or not. In other words, either all the data is the source area is copied to the destination area or no such data is copied. Based on this, step S10 may be characterized as leaving such a transaction for the copy operation open or outstanding which now has to be committed.

In connection with the foregoing open transaction state, after step S14 has completed and the data is transferred to cache 304h, processing may be performed to close out or commit the copy operation transaction. Processing is thus performed in step S15 where a request is sent to commit the MFR (map for read) previously performed in step S4. Similarly processing is performed in steps S16 and S17 where a request is sent to commit the MFW previously performed in step S11. The commit MFR in S15, for example, releases the lock on the source LUN previously acquired in S4, and the commit MFW of S16 and S17, for example, releases the lock on the destination LUN previously acquired in S11 thereby committing the copy operation transaction.

What will now be described is general processing that may be performed upon the occurrence of a failure of SP A or SP B prior to completing the copy operation. Generally, following are some examples of what may be performed in an embodiment. However, more generally, an embodiment may perform any suitable processing which provides for recovery and failover to the remaining healthy SP that maintains transactional atomicity of the copy operation such as issued from the host in step S1 of FIG. 4.

Generally, in response to SP A or SP B failing prior to completion of the transaction or copy request, an embodiment may perform any suitable processing which maintains atomicity of the transaction or copy request where such processing may vary with when such failure occurred in connection with steps described herein for the transaction or copy request. In all cases, if the remaining healthy SP may assume processing responsibilities of the failed SP (e.g., processing for I/Os directed to LUNs owned by SP B).

If SP A (or more generally, the SP receiving the copy operation request in step S1) fails after step S10. SP B has an open transaction. If SP B receives notification that SP A has failed after S10 has occurred, SP B may perform processing to abort the open transaction. For example, SP B may perform processing to abort the MFW from S11 and release the lock acquired as a result of previously performed step S11.

Alternatively, consider cases where SP B fails, then generally SP A needs to perform any necessary cleanup of the transaction. Assuming the copy operation transaction has progressed to the point where SP A has the destination location's physical storage mapping information (e.g., after step S10), SP A may complete its processing through step S15 and wait an amount of time to see of SP B boots up. If SP B does not recover and resume a functional state within this amount of time, SP A may then mount the CBFS 320f of SP B and obtain SP B's metadata management and mapping information for LUNs owned by SP B. SP A may then proceed with recovery processing. Recovery processing may include SP A performing processing on behalf of the failed peer SP, SP B, such as by completing step S17 whereby the lock on the destination LUN previously acquired in S11 is now released. Recovery processing may generally cause failover to SP A whereby SP A performs any needed processing on SP B's behalf such as in connection with other transactions and requests for any LUNs owned by SP B.

If SP B fails prior to SP A having received the destination location's physical storage mapping information (e.g. prior to step S10 returning the mapping information to SP A), SP A may abort the transaction and perform processing including aborting the MFR from step S4. In this case, the aborting of the transaction may include releasing the lock acquired previously in step S4. Alternatively, if SP B fails prior to SP A having received the DST physical storage mapping information. SP A may take over processing for the failed SP B, for example, by mounting SP B's CBFS 320f and having SP A complete processing for the transaction whereby SP A now performs all steps for the transaction.

Referring back to FIG. 4, it should be noted that the copy request of step S1 may be received by either SP A or SP B. Thus, the SP receiving the copy request may be owner of the source LUN as described in connection with FIG. 4. Alternatively, the SP receiving the copy request may be the owner of the destination LUN rather than the source LUN. In this case where the receiving SP does not own the source LUN and rather the source LUN is owned by the peer SP, an embodiment in accordance with techniques herein may send the copy request to the peer SP for processing. In this manner, the SP controlling the copy operation may be the owner of the source LUN and the controlling SP may then perform processing as described in FIG. 4.

Figure 6:
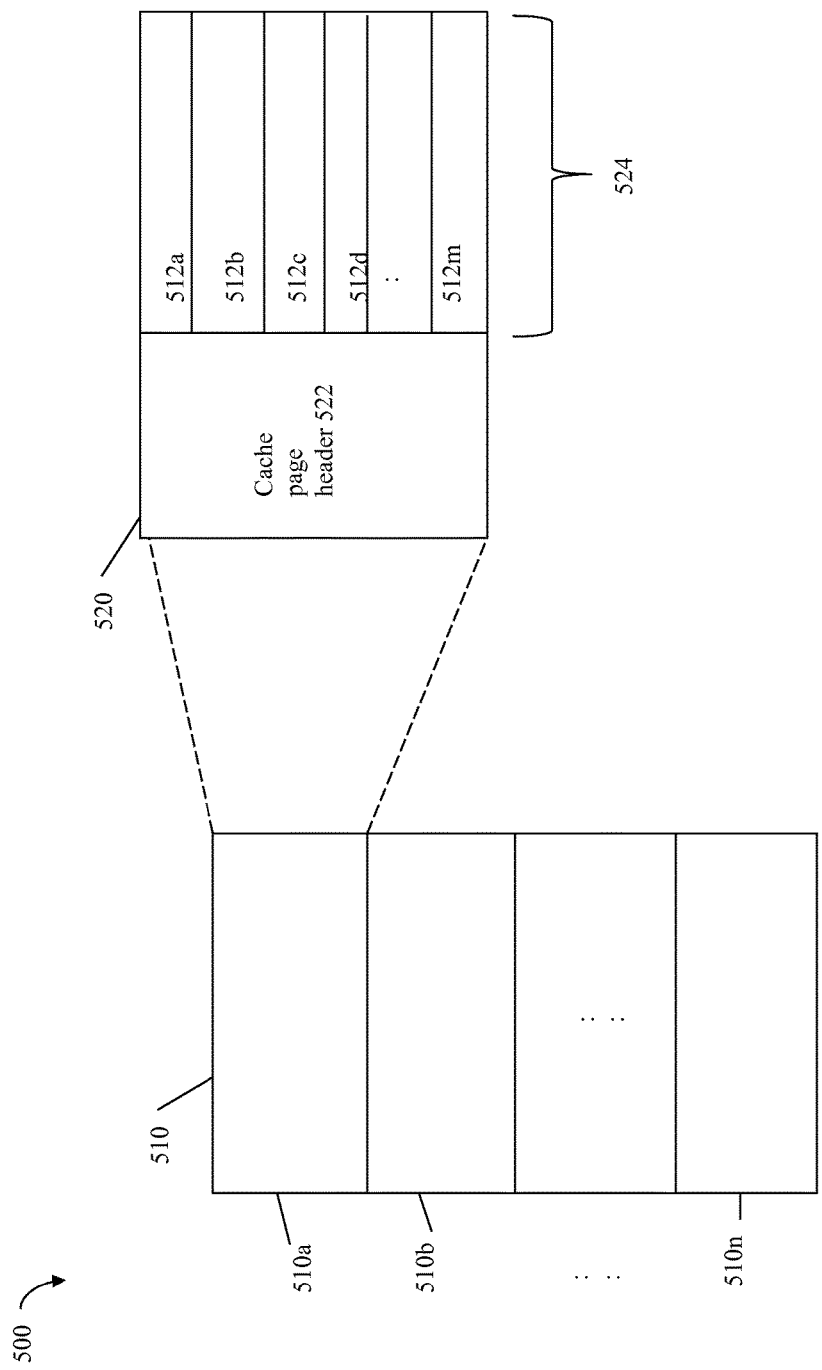
FIG. 6 is an example of a logical representation of a data cache that may be used in an embodiment in accordance with techniques herein.

Referring to FIG. 6, shown is an example illustrating a logical representation of a data cache that may be used in an embodiment in accordance with techniques herein. The cache of the example 500 may represent the data caches, such as cache 304h and 320h of FIG. 4. In the example 500, element 510 may represent the memory or storage used as the data cache which is partitioned into cache pages 510a-510n. It should be noted that the example 500 is a logical representation of a cache that may be implemented using any suitable data structure(s) known in the art. As described elsewhere herein, each of the cache pages 510a-n may contain varying amounts of WP data. Element 520 provides additional detail of single cache page 520. Cache page 520 may include a cache page header 522 and cache page data 524. The cache page data 524 illustrates that a single cache page of data may further include multiple portions 512a-m each of which may or may not include WP data and each of which may or may not include any cached data. The cache page header 522 may include additional information, such as metadata, regarding the cached data stored in 524. For example, the header 522 may denote whether the data cached in each of the portions 512a-m is WP data.

Although not illustrated in FIG. 6 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 510 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 510a (illustrated in more detail by 520), not all the data of the single cache page may be WP data. For example, within a single cache page, it may be that one or more portions 512a-m of the page 520 include WP data as well as non-WP data. For example, the cache page 520 may include non-WP data in 512a and 513c (e.g., 512a and 512c may include data read from a physical device and stored in the cache page in connection with servicing a read miss operation). Additionally, one or more portions 512a-m of the same cache page 520 including WP data may be empty and contain no data. For example, all of page 520 may include WP data except for 512a-b which may contain no cached data.

It should be noted that each portion 512a-m of a cache page may correspond, for example, to a track or other storage size unit.

It should be noted that the foregoing describes various modules of code that may be executed on SPs of a data storage system to perform processing of techniques herein. As a variation, an embodiment may also execute code performing techniques herein in a virtualized environment on the data storage system. For example, code modules described herein may execute in the context of a virtual machine on the data storage system. For example, an embodiment may have one or more VMs executing on a data storage system where such one or more VMs execute code to perform processing described herein in a virtualized environment using virtualization software, such as vSphere™ from VMware, Inc.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of copying data comprising:
receiving, at a first storage processor of a data storage system, a copy request to perform an internal copy operation within the data storage system, the copy request including copying source data from a source area of a source logical device of the data storage system to a destination area of a destination logical device also included in the data storage system, said data storage system including the first storage processor and a second storage processor;
determining whether the first storage processor owns the source logical device;
responsive to determining the first storage processor does not own the source logical device, forwarding the copy request to the second storage processor that owns said source logical device, wherein said second storage processor performs subsequent processing to service the copy request; and
responsive to determining said source logical device is owned by the first storage processor of the data storage system, performing processing comprising:
    determining said destination logical device is owned by the second storage processor of the data storage system;
    receiving, at the first storage processor from the second storage processor, destination location physical storage mapping information for the destination area on the destination logical device;
    determining, using the destination location physical storage mapping information, a destination physical device location corresponding to the destination area on the destination logical device;
    performing other processing by cache and RAID management layers of the first storage processor, the other processing including:
        issuing, by the cache and RAID management layers of the first storage processor, a rendezvous request to a data movement library of an upper layer of a call stack of the first storage processor, to provide destination location physical storage mapping information for the destination area to the cache and RAID management layers of the first storage processor;
        responsive to the rendezvous request, receiving, by the cache and RAID management layers of the first storage processor, the destination location physical storage mapping information for the destination area;
        issuing a read request to obtain the source data from the source area wherein responsive to the read request, the source data is stored in a first cache location of a first data cache of the first storage processor; and
        modifying the first cache location of the first data cache of the first storage processor to indicate that the first cache location includes write pending data for the destination physical device location corresponding to the destination area of the destination logical device owned by the second storage processor; and
        destaging the source data from the first cache location to the destination physical device location.

2. The method of claim 1, further comprising:
issuing a request from the first storage processor to the second storage processor for the destination location physical storage mapping information;
receiving the request on the second storage processor and performing first processing comprising:
    acquiring, prior to performing said storing, a first lock that locks logical addresses on the destination logical device corresponding to the destination area to thereby provide exclusive access to the destination area.

3. The method of claim 2, further comprising:
releasing the first lock subsequent to completing said storing.

4. The method of claim 3, further comprising:
acquiring, prior to performing said storing, a second lock that locks logical addresses on the source logical device corresponding to the source area to thereby provide exclusive access to the source area.

5. The method of claim 4, further comprising:
releasing the second lock subsequent to completing said storing.

6. The method of claim 1, wherein the destination area is mapped by the destination location physical storage mapping information to an offset on a physical device.

7. The method of claim 1, wherein the destination location physical storage mapping information includes RAID group information identifying a RAID group and a location in the RAID group corresponding to the destination area.

8. The method of claim 7, wherein the RAID group information is expressed in terms of a private logical device location mapped to the destination physical device location which is a location on a physical device, wherein the private logical device location is a location on a private logical device used internally in the data storage system.

9. The method of claim 1, further comprising:
obtaining by the first storage processor source location physical storage mapping information for the source area on the source logical device; and
determining, using the source location physical storage mapping information, a source physical device location corresponding to the source area on the source logical device, wherein said first storage processor uses the source physical device location to read the source data stored in the first cache location.

10. The method of claim 1, wherein the first storage processor owning the source logical device indicates that only the first storage processor is able to process I/O operations directed to the source logical device, and wherein the second storage processor owning the destination logical device indicates that only the second storage processor is able to process I/O operations directed to the second logical device.

11. The method of claim 10, wherein only the first storage processor and not the second storage processor reads data from and writes data to physical storage provisioned for the source logical device.

12. The method of claim 11, wherein only the second storage processor and not the first storage processor reads data from and writes data to physical storage provisioned for the destination logical device.

13. The method of claim 1, wherein the copy request is sent by a host to the data storage system.

14. The method of claim 1, wherein the source logical device and the destination logical device are any of a virtually provisioned logical device and a thick logical device.

15. The method of claim 1, wherein the copy request is sent by a component internal with the data storage system.

16. The method of claim 1, wherein the copy request is a single transaction and one of the first storage processor and the second storage processor fails prior to completing the single transaction, and wherein a remaining one of the first and second storage processors that has not failed performs first processing that includes either aborting or completing the copy request and assuming processing responsibilities of the one storage processor that failed.

17. A data storage system comprising:
 a first storage processor and a second storage processor;
 a memory comprising code stored therein that, when executed, performs a method of copying data comprising:
  receiving, at the first storage processor, a copy request to perform an internal copy operation within the data storage system, the copy request including copying source data from a source area of a source logical device to a destination area of a destination logical device;
  determining whether the first storage processor owns the source logical device;
  responsive to determining the first storage processor does not own the source logical device, forwarding the copy request to the second storage processor that owns the source logical device, wherein said second storage processor performs subsequent processing to service the copy request; and
  responsive to determining said source logical device is owned by the first storage processor of the data storage system, performing processing comprising:
   determining said destination logical device is owned by the second storage processor of the data storage system;
   receiving, at the first storage processor from the second storage processor, destination location physical storage mapping information for the destination area on the destination logical device;
   determining, using the destination location physical storage mapping information, a destination physical device location corresponding to the destination area on the destination logical device;
   performing other processing by cache and RAID management layers of the first storage processor, the other processing including:
    issuing, by the cache and RAID management layers of the first storage processor, a rendezvous request to a data movement library of an upper layer of a call stack of the first storage processor, to provide destination location physical storage mapping information for the destination area to the cache and RAID management layers of the first storage processor:
    responsive to the rendezvous request, receiving, by the cache and RAID management layers of the first storage processor, the destination location physical storage mapping information for the destination area;
    issuing a read request to obtain the source data from the source area wherein responsive to the read request, the source data is stored in a first cache location of a first data cache of the first storage processor; and
    modifying the first cache location of the first data cache of the first storage processor to indicate that the first cache location includes write pending data for the destination physical device location corresponding to the destination area of the destination logical device owned by the second storage processor; and
   destaging the source data from the first cache location to the destination physical device location.

18. A non-transitory computer readable medium comprising code stored thereon that, when executed, performs a method of copying data comprising:
 receiving, at a first storage processor of a data storage system, a copy request to perform an internal copy operation within the data storage system, the copy request including copying source data from a source area of a source logical device of the data storage system to a destination area of a destination logical device also included in the data storage system, said data storage system including the first storage processor and a second storage processor;
 determining whether the first storage processor owns the source logical device;
 responsive to determining the first storage processor does not own the source logical device, forwarding the copy request to the second storage processor that owns said source logical device, wherein said second storage processor performs subsequent processing to service the copy request; and
 responsive to determining said source logical device is owned by the first storage processor of the data storage system, performing processing comprising:
  determining said destination logical device is owned by the second storage processor of the data storage system;
  receiving, at the first storage processor from the second storage processor, destination location physical storage mapping information for the destination area on the destination logical device;
  determining, using the destination location physical storage mapping information, a destination physical device location corresponding to the destination area on the destination logical device;
  performing other processing by cache and RAID management layers of the first storage processor, the other processing including:
   issuing, by the cache and RAID management layers of the first storage processor, a rendezvous request to a data movement library of an upper layer of a call stack of the first storage processor, to provide destination location physical storage mapping information for the destination area to the cache and RAID management layers of the first storage processor;
   responsive to the rendezvous request, receiving, by the cache and RAID management layers of the first storage processor, the destination location physical storage mapping information for the destination area;
   issuing a read request to obtain the source data from the source area wherein responsive to the read request, the source data is stored in a first cache location of a first data cache of the first storage processor; and modifying the first cache location of the first data cache of the first storage processor to indicate that the first cache location includes write pending data for the destination physical device location corresponding to the destination area of the destination logical device owned by the second storage processor; and destaging the source data from the first cache location to the destination physical device location.

* * * * *